United States Patent
Lavoie et al.

(10) Patent No.: US 9,821,848 B2
(45) Date of Patent: Nov. 21, 2017

(54) MODULAR PRO TBA KNOB FOR OPEN STORAGE AREAS

(71) Applicant: Ford Global Technologies, LLC, Dearborn, MI (US)

(72) Inventors: Erick Michael Lavoie, Dearborn, MI (US); Donald Jacob Mattern, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/094,829

(22) Filed: Apr. 8, 2016

(65) Prior Publication Data

US 2017/0291639 A1    Oct. 12, 2017

(51) Int. Cl.
*G08B 21/00* (2006.01)
*B62D 15/02* (2006.01)
*B62D 13/06* (2006.01)

(52) U.S. Cl.
CPC .......... *B62D 15/029* (2013.01); *B62D 13/06* (2013.01)

(58) Field of Classification Search
CPC ...... B62D 15/029; B62D 13/06; B60Q 5/005; H04R 9/06; H04R 7/18; H04R 3/00; H04R 2430/01
USPC .......... 340/931, 431, 941, 463; 701/1, 2, 41, 701/458
See application file for complete search history.

(56) References Cited

U.S. PATENT DOCUMENTS

| | | | |
|---|---|---|---|
| 6,886,860 B2 | 5/2005 | Singleton et al. | |
| 2008/0086240 A1* | 4/2008 | Breed | G07C 5/008 701/1 |
| 2008/0314186 A1 | 12/2008 | Ford | |
| 2011/0153150 A1* | 6/2011 | Drew | G07C 5/0808 701/31.4 |
| 2013/0268160 A1* | 10/2013 | Trombley | B62D 13/06 701/42 |
| 2014/0174233 A1 | 6/2014 | Giefer et al. | |
| 2014/0324295 A1* | 10/2014 | Lavoie | B62D 13/06 701/41 |

FOREIGN PATENT DOCUMENTS

DE    10120465 A1    11/2002
JP    2003291780 A    10/2003

* cited by examiner

*Primary Examiner* — Dhaval Patel
(74) *Attorney, Agent, or Firm* — James P. Muraff; Neal, Gerber & Eisenberg LLP (57) ABSTRACT

A vehicle trailer backup assist control module for positioning in an open area of a vehicle is disclosed, comprising a control device configured to mate electrically and mechanically with a modular adapter for removable positioning the module in the open area of the vehicle, a user interface for receiving gestures from a user and for providing feedback to the user, at least one visual indicator for indicating a status of the control device and/or of a trailer backup assist function of the vehicle, and a data port for transmitting and receiving data to and from the vehicle for controlling a trailer backup assist function of the vehicle.

19 Claims, 6 Drawing Sheets

MODULAR PRO TBA KNOB FOR OPEN STORAGE AREAS

BACKGROUND

This application relates generally to the field of control devices for use in vehicle passenger compartments, and more particularly to systems and methods for modularizing vehicle trailer backup control devices.

Vehicle Trailer Backup Assist (TBA) systems help a driver of a vehicle, such as an automobile, to navigate and position the direction of towed articles, such as trailers, boats, etc. while the vehicle is being driven in reverse. To coordinate the movement and direction of the trailer by the driver, a driver can command the trailer backup assist function of the vehicle using a control device positioned in the dashboard of the vehicle. But packaging such control devices in the dashboard of some vehicles may be difficult or cost prohibitive given the limited space that may be available in the dashboard. The location of the control device needs to be far enough from the steering wheel to provide clearance to freely operate the control device during TBA operations. On the other hand, the control device must be located within convenient reach of the driver. In smaller vehicles, other critical and high usage control devices may occupy the zones where the control device for TBA operations would ideally be located. Furthermore, many dashboards cannot easily accommodate retrofit insertion or positioning of a control device for TBA operations in or on the dashboard.

There exists a need, therefore, for a control device to enable TBA operations and which solves these problems.

SUMMARY

An embodiment of a vehicle trailer backup assist control module for positioning in an open area of a vehicle is disclosed. In one embodiment, the control module includes a housing configured to mate electrically and mechanically with a modular adapter for removable positioning the module in the open area of the vehicle, a user interface including a rotatable dial connected to the housing for receiving gestures from a user and for providing feedback to the user, and a data port for transmitting and receiving data to and from the vehicle for controlling a trailer backup assist function of the vehicle.

The open area may include a vehicle cupholder. The control module may include a power port for receiving vehicle electrical power, a rechargeable battery, and an inductive charging circuit for charging the battery. The control module may include a sensor, a processor, and memory, where the sensor may be configured to detect an angle of rotation of the dial by a user. The control module may include an analog-to-digital converter to convert the detected angle of rotation to a digital form.

The housing may include a first body portion and a second body portion extending therefrom. The second body portion may be configured to mate with the adapter. The housing may include an extension portion extending from the second body portion and positioned offset from a centerline of the second body portion. The extension portion may be received by a receptacle in the adapter that is positioned offset from a centerline of the adapter, the extension portion and the receptacle thereby creating a keyed relationship between the housing and the adapter. The user interface may include at least one visual indicator configured to indicate an operating status of the module and/or the trailer assist backup function of the vehicle. The at least one visual indicator may include an LED. The data port may be configured to transmit data either wired or wirelessly to the vehicle.

In another embodiment, a vehicle trailer backup assist control module for positioning in an open area of a vehicle is disclosed, the control module comprising a housing configured to mate electrically and mechanically with a modular adapter for removable positioning the module in the open area of the vehicle, the adapter including a receptacle for receiving the housing and wherein the housing and the adapter are keyed to fit together in one orientation, a user interface including a rotatable dial connected to the housing for receiving gestures from a user and for providing feedback to the user, and a data port for transmitting and receiving data to and from the vehicle for controlling a trailer backup assist function of the vehicle.

The open area may include a vehicle cupholder. The control module may include a rechargeable battery, an inductive charging circuit for charging the battery, an angle sensor, a processor, and memory, where the angle sensor may be configured to detect an angle of rotation of the dial by a user. The control module may also include an analog-to-digital converter to convert the angle of rotation to a digital form. The user interface may include at least one LED to indicate an operating status of the module and/or the trailer assist backup function of the vehicle.

In another embodiment, a vehicle trailer backup assist control module for positioning in a cupholder of a vehicle is disclosed, the control module comprising a housing connected electrically and mechanically to a modular adapter for removably positioning the module in the cupholder, the adapter including a receptacle for receiving a housing portion and wherein the housing portion and the adapter are keyed to fit together in one orientation, a user interface including a rotatable dial connected to the housing for receiving gestures from a user and for providing feedback to the user, and a data port for transmitting and receiving data to and from the vehicle for controlling a trailer backup assist function of the vehicle.

The control module may include including a rechargeable battery, an inductive charging circuit for charging the battery, an angle sensor, a processor, and memory, where the angle sensor may be configured to detect an angle of rotation of the dial by a user. The user interface may include at least one LED to indicate an operating status of the module and/or the trailer assist backup function of the vehicle.

DETAILED DESCRIPTION

Although the figures and the instant disclosure describe one or more embodiments of a trailer backup assist control device, one of ordinary skill in the art would appreciate that the teachings of the instant disclosure would not be limited to these embodiments.

Turning now to the drawings wherein like reference numerals refer to like elements, there are shown exemplary embodiments and methods of using a trailer backup assist control device. In one embodiment, the trailer backup assist control device can be docked in an open storage area of the vehicle, including an existing cup holder, for example. The trailer backup assist control device of the instant disclosure may be used in any number of different vehicle makes and models by utilizing a common, modularized trailer backup assist control device housing or body together with appropriate customized adapters for removable positioning in the vehicle passenger compartment.

Figure 1A:
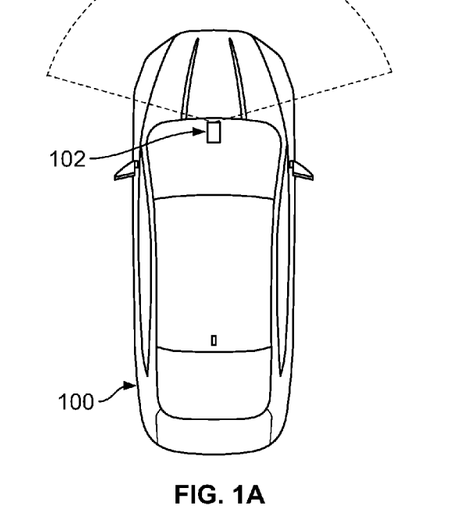
FIG. 1A illustrates a top view of a vehicle of the instant disclosure.
Figure 1B:
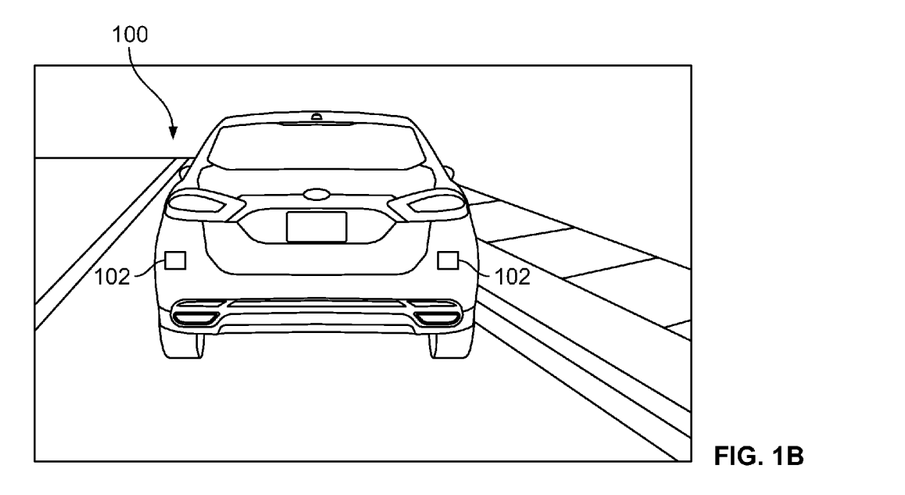
FIG. 1B illustrates a rear view of the vehicle shown in FIG. 1A.

FIGS. 1A-1B show vehicle 100 in accordance with one embodiment of the instant disclosure. In this embodiment, vehicle 100 is an automobile, though in other embodiments vehicle 100 may be any suitable vehicle (such as a truck, a watercraft, or an aircraft). Vehicle 100 may be a gasoline powered vehicle, a hybrid vehicle, an electric vehicle, a fuel cell vehicle, or any other type of suitable vehicle. Vehicle 100 may include standard features, such as a dashboard, adjustable seats, one or more batteries, an engine or motor, a transmission, an HVAC system including a compressor and electronic expansion valve, a windshield and/or one or more windows, doors, a rear view mirror, a right side view mirror, a left side view mirror, seatbelts, airbags, wheels, and tires.

Figure 2:
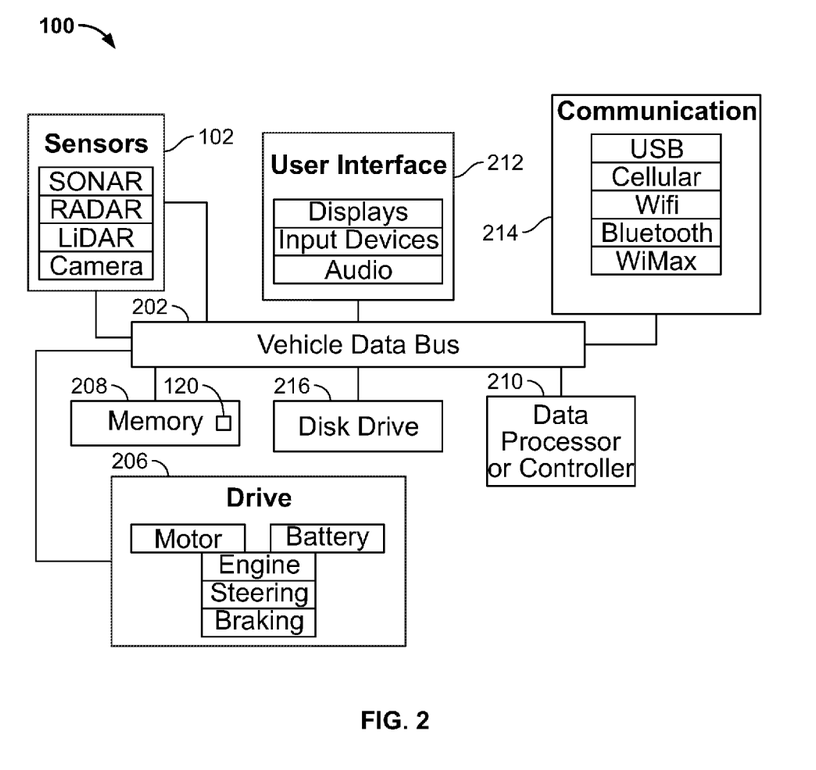
FIG. 2 illustrates a block diagram of exemplary components of the vehicle shown in FIG. 1A.

As shown in FIGS. 1A-1B and 2, vehicle 100 may include sensors 102, which may be arranged in and around the vehicle in a suitable fashion. Sensors 102 can all be the same or they can vary from one to the next. Sensors 102 may include many sensors or only a single sensor.

Certain of the sensors 102 may be configured to obtain data about the environment surrounding the vehicle (e.g., position sensors or weather sensors), as indicated by the dashed line in FIG. 1A, while others obtain data about components of the vehicle itself (e.g., gas level sensors or oil pressure sensors). The sensors 102 may be configured to transmit the data they obtain to one or more controllers of the vehicle 100, such as to controller 210 (described below), for further processing. The sensors 102 may include any suitable sensor or sensors such as, but not limited to: (1) infrared sensors; (2) visual sensors (such as cameras); (3) ultrasonic sensors; (4) RADAR; (5) LIDAR; (6) laser-scan sensors; (7) inertial sensors (for example, an inertial measurement unit); (8) wheel speed sensors; (9) road condition sensors (to directly measure certain road conditions); (10) rain sensors; (11) suspension height sensors; (12) steering wheel angle sensors; (13) steering torque sensors; (14) brake pressure sensors; (15) tire pressure sensors; or (16) vehicle location or navigation sensors (such as a Global Positioning System). Sensors 102 may include gear sensors configured to detect gear engagement of the vehicle's transmission, accelerometers configured to detect vehicle acceleration, speed sensors to detect vehicle speed, wheel speed, and/or steering wheel speed, torque sensors to detect engine or motor output torque, driveline torque, and/or wheel torque, and position sensors to detect steering wheel angular position, brake pedal position, and/or mirror position. Some sensors 102 may be mounted inside the passenger compartment of vehicle 100, around the exterior of the vehicle, or in the engine compartment of vehicle 100. At least one sensor 102 may be used to identify the vehicle's driver via facial recognition, speech recognition, or communication with a device, such as a vehicle key or mobile phone personal to the driver.

Sensors 102 may have an OFF state and various ON states. Vehicle 100, or a device operatively connected to the vehicle, may be configured to control the states or activity of the sensors. It should be appreciated that the term "internal sensors" includes all sensors mounted to the vehicle, including sensors that are mounted to an exterior of vehicle 100.

As shown in FIG. 2, in one embodiment, vehicle 100 includes a vehicle data bus 202 operatively coupled to sensors 102, vehicle drive devices 206, memory or data storage 208, a processor or controller 210, a user interface 212, communication devices 214, and a disk drive 216.

The processor or controller 210 may be any suitable processing device or set of processing devices such as, but not limited to: a microprocessor, a microcontroller-based platform, a suitable integrated circuit, or one or more application-specific integrated circuits (ASICs).

The memory 208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); read-only memory; a hard drive; a solid state hard drive; or a physical disk such as a DVD. In an embodiment, the memory includes multiple kinds of memory, particularly volatile memory add non-volatile memory.

The communication devices 214 may include a wired or wireless network interface to enable communication with an external network. The external network may be a collection of one or more networks, including standards-based networks (e.g., 2G, 3G, 4G, Universal Mobile Telecommunications Autonomous valet parking system (UMTS), GSM® Association, Long Term Evolution (LTE)™, or more); WMAX; Bluetooth; near field communication (NFC); WiFi (including 802.11 a/b/g/n/ac or others); WiGig; Global Positioning System (GPS) networks; and others available at the time of the filing of this application or that may be developed in the future. Further, the external network(s) may be a public network, such as the Internet; a private network, such as an intranet; or combinations thereof, and may utilize a variety of networking protocols now available or later developed including, but not limited to, TCP/IP-based networking protocols. The communication devices 214 may also include a wired or wireless interface to enable direct communication with an electronic device, such as a USB or Bluetooth interface.

The user interface 212 may include any suitable input and output devices. The input devices enable a driver or a passenger of vehicle 100 to input modifications or updates to information shown in, for example, a vehicle display. The input devices may include, for instance, a control knob, an instrument panel, a keyboard, a scanner, a digital camera for image capture and/or visual command recognition, a touch screen, an audio input device (e.g., cabin microphone), buttons, a mouse, or a touchpad. The output devices may include instrument cluster outputs (e.g., dials, lighting devices), actuators, a display (e.g., a liquid crystal display ("LCD"), an organic light emitting diode ("OLED"), a flat panel display, a solid state display, a cathode ray tube ("CRT"), or a heads-up display), and speakers. It should be appreciated that the term pressing a button or feature also includes pressing or activating a virtual button or feature, such as using a mouse to click on an item on a display, or pressing a virtual button on a touch screen.

The disk drive 216 is configured to receive a computer readable medium. In certain embodiments, the disk drive 216 receives the computer-readable medium on which one or more sets of instructions. The instructions may embody one or more of the methods or logic as described herein. In a particular embodiment, the instructions may reside completely, or at least partially, within any one or more of the main memory 208, the computer readable medium, and/or within the processor 210 during execution of the instructions.

The term "computer-readable medium" should be understood to include a single medium or multiple media, such as a centralized or distributed database, and/or associated caches and servers that store one or more sets of instructions. The term "computer-readable medium" also includes any tangible medium that is capable of storing, encoding or carrying a set of instructions for execution by a processor or that cause a system to perform any one or more of the methods or operations disclosed herein.

In one embodiment, the vehicle 100 includes a one or more computer programs or subprograms 120 stored in the memory 208. When executed by the processor, the one or more computer programs or subprograms 120 generate or select instructions for other elements of the vehicle to perform. In various embodiments, the one or more computer programs or subprograms 120 are configured to direct instructions to the user interface 212, the communication devices 214, the vehicle drive 206, the sensors 102, the processor 210, and any other component operatively connected to the vehicle data bus 202. It should be appreciated that vehicle 100 may be fully autonomous or partially autonomous.

Figure 3:
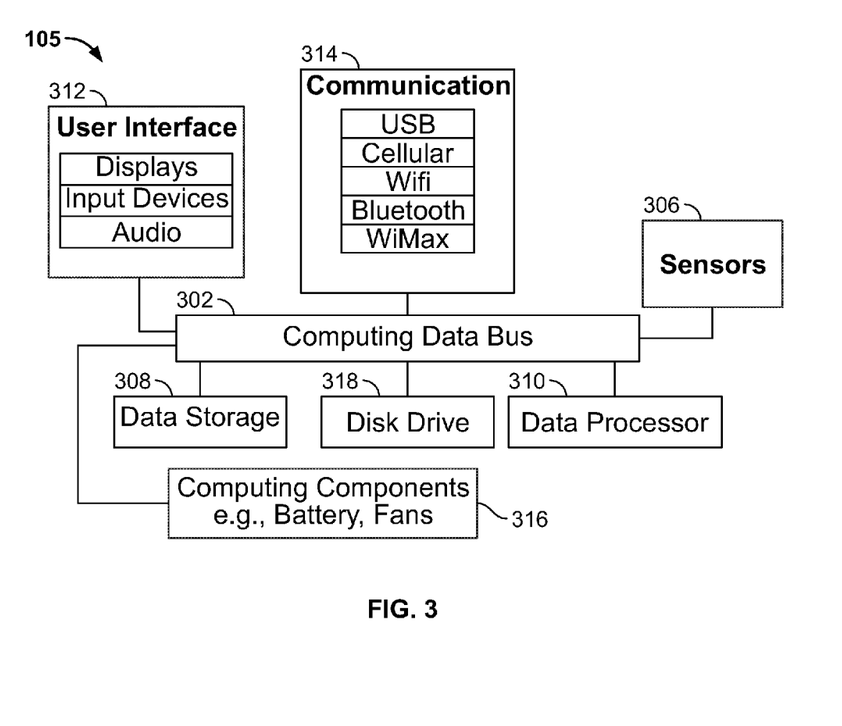
FIG. 3 illustrates a block diagram of an exemplary computing device operatively connected to the vehicle shown in FIG. 1A.

In various embodiments, a computing device 105 is operatively connected to the vehicle 100 via any suitable data connection such as WFi, Bluetooth, USB, or a cellular data connection. In one embodiment, shown in FIG. 3, the computing device 105 includes a data bus 302, operatively coupled to sensors 306, components 316, memory or data storage 308, a processor or controller 310, a user interface 312, and communication devices 314. It should be appreciated that the features of the computing device 105 may be similar to the features of the vehicle 100 as described above. For example, the communication devices 314 of the computing device 105 may operate similar to the communication devices 214 of the vehicle 100. The same applies to the user interface 312, the sensors 306, the data storage 308, the processor 310, and the disk drive 318. In various embodiments, the computing device 105 is a mobile phone or a server.

Turning to FIGS. 4-7, there is shown one embodiment of a modular trailer backup assist control system 400 operable to enable a driver of vehicle 100 to initiate, manipulate, and control trailer backup assist functionality to direct the movement of the vehicle and a towed apparatus behind the vehicle while the vehicle is in reverse. In this embodiment, trailer backup assist control system 400 includes control device 410 and modular adapter 430. In this embodiment, control device 410 is configured to nest with adapter 430, which is configured to nest with cupholder 450, which may be located in the passenger compartment of the vehicle. In other embodiments, trailer backup assist control system 400 may be configured to mount on, to, or nest with any surface, receptacle, or open area of the vehicle passenger compartment, such as an opening or surface on or in the dashboard, console, armrest, etc. In some embodiments, control system 400 is configured to be removably connected to cupholder 450 or such other open area in the vehicle. In some embodiments, control system 400 is clamped to or snapped together with cupholder 450 or such other open area in the vehicle. In some embodiments, control system 400 is configured to be permanently connected to cupholder 450 or such other open area in the vehicle.

Figure 4:
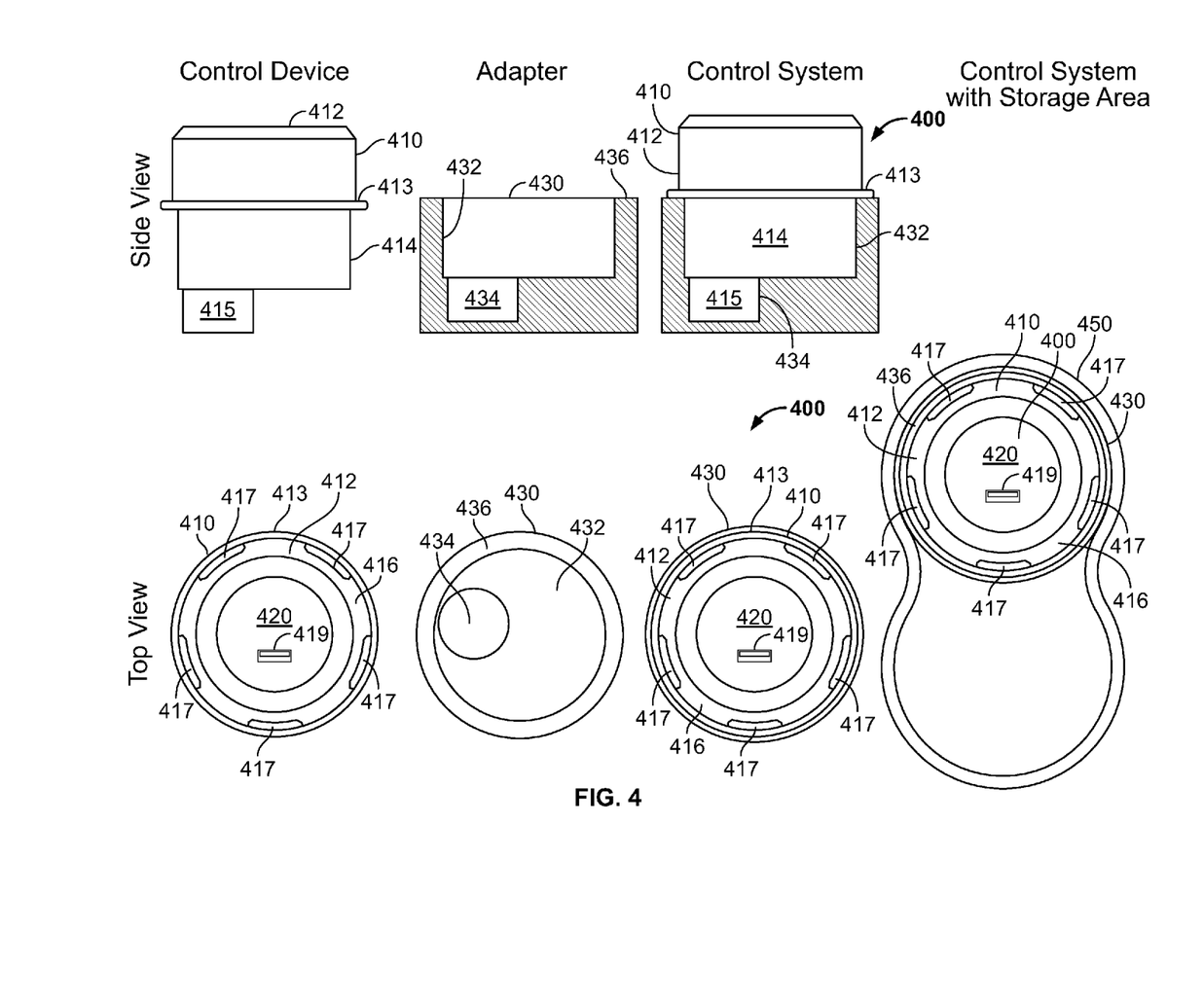
FIG. 4 illustrates an exemplary embodiment of a control system of the instant disclosure.

In this embodiment, control device 410 includes a housing 412 configured to mate with adapter 430. To mate with adapter 430, housing 412 of control device 410 includes stop 413, body portion 414 and protrusion 415 extending therefrom. Body portion 414 of control device 410 is configured to nest and/or mate with receptacle 432 of adapter 430, and protrusion 415 of control device 410 is configured to nest and/or mate with receptacle 434 of adapter 430. Stop 413 is configured to mate with top surface 436 of adapter 430. In this embodiment, stop 413 is configured as a circumferential protrusion extending from housing 412. In other embodiments, stop 413 may have any geometry or not exist at all.

Figure 5:
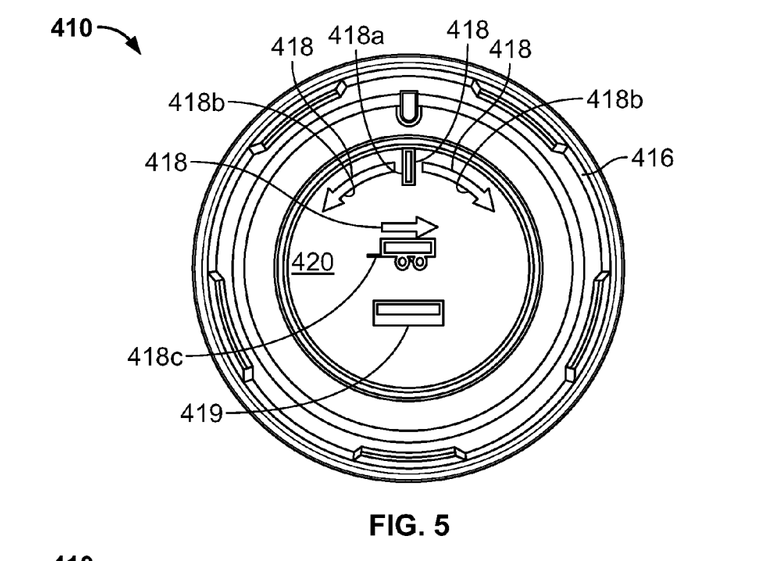
FIG. 5 illustrates a front view of an exemplary embodiment of a control device of the instant disclosure.
Figure 6:
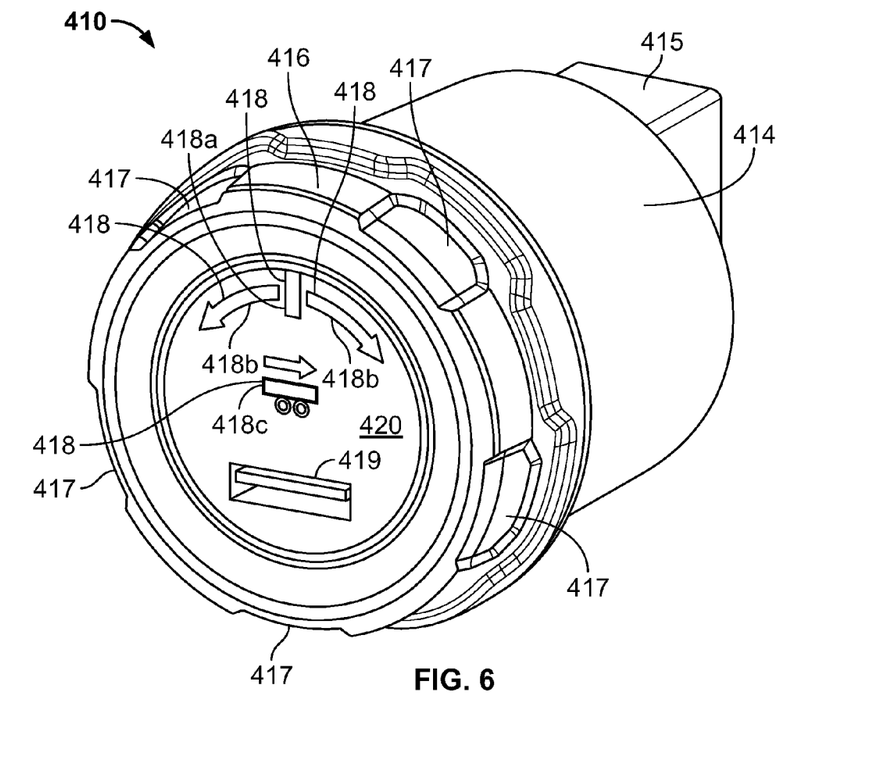
FIG. 6 illustrates a front perspective view of the control device shown in FIG. 5.

In the embodiment shown in FIGS. 4-6, control device 410 and adapter 430 are keyed with asymmetric features to permit only one way to connect the two parts together. For example, as shown in FIG. 4, receptacle 435 and protrusion 415 are positioned offset from center so as to form an asymmetric union between control device 410 and adapter 430. In other embodiments, protrusion 415 of control device 410 and receptacle 435 of adapter 430 are positioned symmetrically so as to form a symmetric union between control device 410 and adapter 430.

In some embodiments, control device 410 is configured to be removably connected to adapter 430. In some embodiments, control device 410 is clamped to or snapped together with adapter 430. In some embodiments, control device 410 is configured to be permanently connected to adapter 430. In some embodiments control device 410 is integrally formed as a part of adapter 430 and therefore is preconfigured to mate with the cupholder 450 or such other surface, receptacle, or open area of the vehicle passenger compartment. In some embodiments, control device 410 is configured to mate directly with the cupholder 450 or such other surface, receptacle, or open area of the vehicle passenger compartment. Adapter 430 may be configured in any geometrical shape to mate with any shape of cupholder 450 or such other surface, receptacle, or open area of the vehicle passenger compartment.

Although shown in FIGS. 4-6 as having a generally circular outer profile, control device 410 may have any outer geometrical profile of any shape and any number of sides, facets, surfaces, and textures. Control device 410 may be configured to internally house electronics including a circuit board having a CPU and memory operable to receive input commands from a user, interpret the input commands, and cause activation of one or more subprograms, such as a trailer backup assist subprogram, to respond to the input commands. Control device 410 may include one or more input devices to receive user input commands. In the embodiment shown in FIGS. 4-6, control device 410 includes knob or dial 416 positioned on a periphery of the control device 410 for receiving user input commands. Dial 416 may include one or more grip portions 417 to assist a user to easily grasp, manipulate, and/or at least partially rotate dial 416. Control device 410 may include other input devices, such as button 420, which may be configured, for example, to power on or power off control device 410. In some embodiments, control device 410 may be configured with any number of different user input mechanisms without departing from the scope of the instant disclosure. In this embodiment, dial 416 is configured to rotate in any increment in the range from approximately 0 degrees to approximately 90 degrees clockwise and counterclockwise from a starting, home position. At least one spring may be connected to dial 416 to return the dial 416 to the starting, home position after being rotated to a desired angle.

As best shown in FIGS. 5-6, a user facing side, such as a front side, of control device 410 may include one or more visual indicators 418, which may be configured to illuminate, blink, or otherwise alert the user of the status of activation, for example, of the trailer backup assist function. In some embodiments, visual indicator 418 includes one or more LED's of any color, size, shape, and luminosity. In other embodiments, visual indicator 418 includes an array of LED's configured to illuminate either individually or in a group or sequence of groups to provide additional indication options of the status of the trailer backup assist function. As best shown in FIGS. 5-6, visual indicator 418b may be configured in the shape of an arrow to indicate direction, while visual indicator 418a and/or visual indicator 418c may be configured to indicate power on/power off status and/or system or component error or failure status. In some embodiments, control device 410 may be connected to one or more audio devices for audibly alerting a user of one or more of the trailer backup assist functions. Such audio devices may operate in sync with the one or more visual indicators 418.

As shown in FIGS. 4-6, an accessible surface of control device 410 may also include input/output port 419, such as a USB port, to provide power to control device 410 and/or to enable data communication to and from control device 410. For example, user manipulation of control device 410 via dial 416 (for example) may, in turn, be communicated to the vehicle 100 and/or vehicle module via port 419 to activate, deactivate, or otherwise command the operation of the trailer assist backup function of the vehicle. In other embodiments, data communication to and from control device 410 may occur through one or more other ports of control device 410. For example, protrusion 415 of control device 410 may be configured with an input/output data communications port and a power port (see, e.g., electrical connector 449 described below), both of which may be coupled to and/or nested with an input/output data communications port and a power port positioned in receptacle 434 of adapter 430. In turn, adapter 430 may be configured with an input/output data communications port and a power port (see, e.g., electrical connector 459 described below) that is coupled with an input/output data communications port and a power port associated with the cupholder 450 or such other surface, receptacle, or open area of the vehicle passenger compartment. In some embodiments, data communications are transmitted and received using the same port through which electrical power is conveyed to control device 410. In some embodiments, power from the vehicle may be obtained from a 12v receptacle, such as a cigarette lighter power receptacle. In some embodiments, the input/output communications port and/or the power port of control device 410 may be moisture sealed with storable or removable covers over respective electrical connectors. In some embodiments, data communications to and from control device 410 may be conducted wirelessly via, for example, W-Fi, Bluetooth, Near Field Communications, or any other wireless communication protocol, to one or more modules of vehicle 100, such as vehicle network interface 460 and power steering control module (PSCM) 470.

In some embodiments, control device 410 includes a replaceable, portable, and/or rechargeable power source, such as a battery, as an alternative to connecting control device 410 to vehicle electrical power via a power cable. In some embodiments, control device 410 may be configured to connect to vehicle electrical power so as to recharge the onboard battery. In some embodiments, control device 410 may be configured to inductively charge the battery using vehicle electrical power. Such inductive charging mechanisms may be incorporated in adapter 430, cupholder 450 or any surface, receptacle, or open area of the vehicle passenger compartment.

Figure 7:
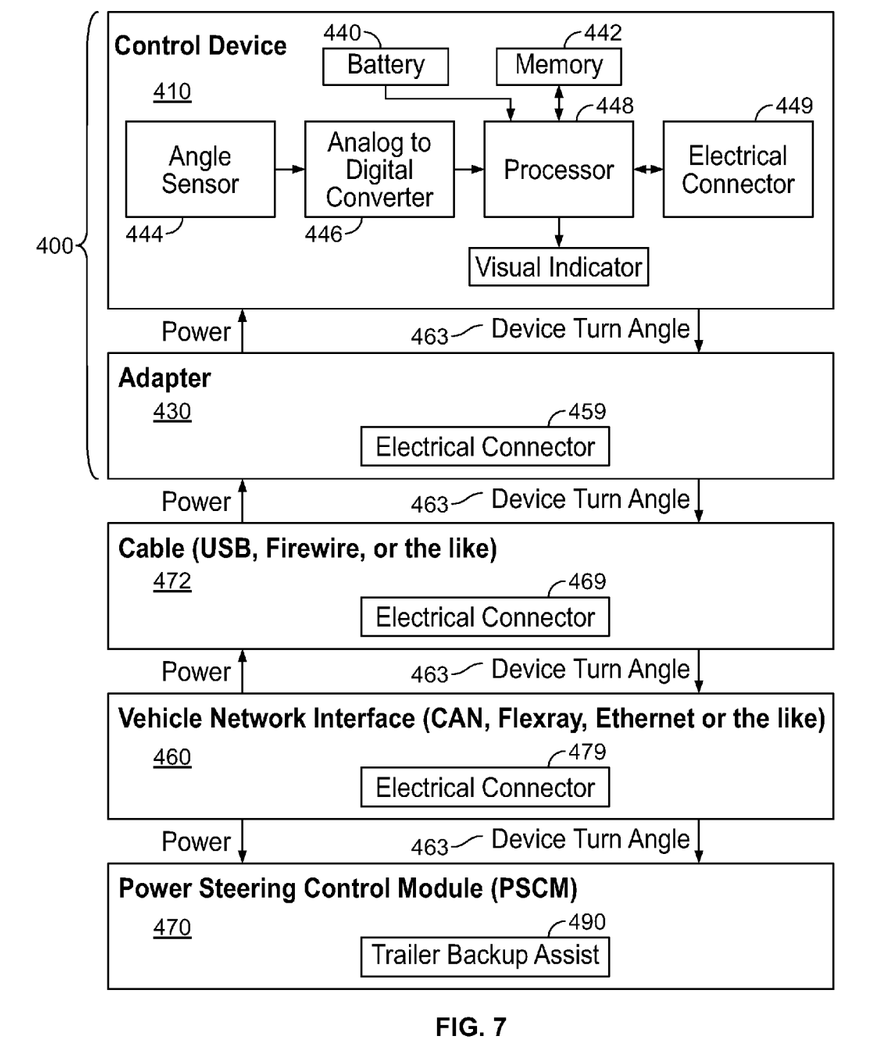
FIG. 7 illustrates an exemplary system schematic diagram of the instant disclosure.

Turning to FIG. 7, control device 410 may include power source or battery 440, memory 442, sensor 444 configured to measure rotational angles of dial 416, analog-to-digital converter 446, processor 448, electrical connector 449, and visual indicator 418. Adapter 430 may include electrical connector 459 for connecting to electrical connector 449 of control device 410. Alternatively, electrical connector 459 may be connected to electrical connector 479 of cable 472.

Control system 400 including control device 410 and adapter 430 may be connected to power steering control module 470 of vehicle 100 via either a wired or wireless connection. Power steering control module 470 may be configured to operate and/or control the trailer backup assist module 490 of vehicle 100. In one embodiment, control system 400 is connected to power steering control module 470 via cable 472, such as a USB cable, a Firewire cable, and the like, which is connected on one end to input/output port 419 and which is connected on the other end to the vehicle via a similar port, such as a port located in the dashboard or to electrical connector 479. From there, data communications to and from control device 410 may be passed to and from vehicle network interface 460, which may include CAN, Flexray, Ethernet and other data communications pathways. Vehicle network interface 460 may be connected to power steering control module 470, as shown in FIG. 7, to communicate user input signals and trailer backup assist system status and feedback information to and from control device 410 and the power steering control module 470. Wireless data communication to and from control device 410 may be routed to and from vehicle network interface 460 or directly to and from power steering control module 470.

Data communications transmitted to power steering control module 470 include user input control signals such as device turn angle 463, which angle may be detected by sensor 444 when a user turns or rotates dial 416 either clockwise or counterclockwise to command turning of the item being towed by vehicle 100. In some embodiments, dial 416 may be configured as a solid state input device such that the dial 416 does not mechanically turn or rotate but which nevertheless detects or is programmed to interpret such rotational motion by a user. In such embodiments, control device 410 may receive and/or provide haptic feedback to the user, with or without visual feedback indications concerning the status or command of the trailer backup assist function of the vehicle.

Trailer backup assist status and functionality, as well as control system 400 status and functionality, may be provided to the user via any number of methods. Control system 400 may be configured to detect and/or provide visual, audio, and/or haptic feedback to a user as to a plurality of conditions or system states of control system 400 and/or the trailer backup assist functionality, including whether wired and/or wireless data communications and/or power connections are properly made with the vehicle and/or appropriate vehicle electronic modules, electrical connection status, inductive charging status, and position and/or connection of respective components (e.g., control device 410 to adapter 430, and control system 400 to cupholder 450), to name a few. Control system 400 may be configured to detect and report any errors to the user, including data communications errors, component assembly misalignments or errors, and/or power connection failures or errors. Likewise, control system 400 may be configured to detect and report successful communication, assembly, and connection status to the user. In some embodiments, reporting of status and/or errors may be provided to a user via a display including, for example, a display in the dashboard of the vehicle, a display hanging from the ceiling, a heads-up display projected onto the windshield, or a display on a portable device.

While specific embodiments have been described in detail, it will be appreciated by those skilled in the art that various modifications and alternatives to those details could be developed in light of the overall teachings of the disclosure. Accordingly, the disclosure herein is meant to be illustrative only and not limiting as to its scope and should be given the full breadth of the appended claims and any equivalents thereof.

What is claimed is:

1. A vehicle control module comprising:
   a modular adaptor defining a receptacle and configured for insertion into a cupholder;
   a housing defining an extension and configured to mate electrically and mechanically with the modular adapter, the extension is received by the receptacle when the housing mates to the modular adaptor;
   a user interface including a rotatable dial connected to the housing; and
   a data port for controlling a trailer backup assist function of a vehicle.

2. The control module of claim 1, including a power port for receiving vehicle electrical power.

3. The control module of claim 1, including a rechargeable battery and an inductive charging circuit for charging the battery.

4. The control module of claim 1, including a sensor, a processor, and memory, wherein the sensor is configured to detect an angle of rotation of the dial by a user.

5. The control module of claim 4, including an analog-to-digital converter to convert the detected angle of rotation to a digital form.

6. The control module of claim 1, wherein the housing includes a first body portion and a second body portion extending therefrom, the second body portion configured to mate with the adapter.

7. The control module of claim 6, wherein the extension extends from the second body portion of the housing and is positioned offset from a centerline of the second body portion.

8. The control module of claim 7, wherein the receptacle of the adapter configured for insertion into the cupholder is positioned offset from a centerline of the adapter, the extension portion and the receptacle creating a keyed relationship between the housing and the adapter.

9. The control module of claim 1, wherein the user interface includes at least one visual indicator configured to indicate an operating status of the control module and/or the trailer backup assist function of the vehicle.

10. A vehicle trailer backup assist control module, the control module comprising:
    a modular adaptor including a receptacle and configured for positioning in an open area of a vehicle;
    a housing defining an extension and configured to mate electrically and mechanically with the modular adapter for removable positioning in the open area, the receptacle is to receive the extension in a keyed relationship to fit the housing and the modular adapter together in one orientation;
    a user interface including a rotatable dial connected to the housing for receiving gestures from a user and for providing feedback to the user; and
    a data port for transmitting and receiving data to and from the vehicle for controlling a trailer backup assist function of the vehicle.

11. The control module of claim 10, wherein the open area comprises a vehicle cupholder.

12. The control module of claim 10, including a rechargeable battery and an inductive charging circuit for charging the battery.

13. The control module of claim 10, including an angle sensor, a processor, and memory, wherein the angle sensor is configured to detect an angle of rotation of the dial by a user.

14. The control module of claim 13, including an analog-to-digital converter to convert the angle of rotation to a digital form.

15. The control module of claim 10, wherein the user interface includes at least one LED to indicate an operating status of the control module and/or the trailer backup assist function of the vehicle.

16. A vehicle trailer backup assist control module, the control module comprising:
    a modular adaptor defining a receptacle and configured for insertion into a cupholder of a vehicle;
    a housing including a housing portion and connected electrically and mechanically to the modular adapter for removably positioning in the cupholder, the receptacle is to receive the housing portion in a keyed relationship to fit the housing portion and the adapter together in one orientation;
    a user interface including a rotatable dial connected to the housing for receiving gestures from a user and for providing feedback to the user; and
    a data port for transmitting and receiving data to and from the vehicle for controlling a trailer backup assist function of the vehicle.

17. The control module of claim 16, including a rechargeable battery and an inductive charging circuit for charging the battery.

18. The control module of claim 16, including an angle sensor, a processor, and memory, wherein the angle sensor is configured to detect an angle of rotation of the dial by a user.

19. The control module of claim 16, wherein the user interface includes at least one LED to indicate an operating status of the module and/or the trailer backup assist function of the vehicle.

* * * * *